(12) United States Patent
Peeters

(10) Patent No.: US 6,952,441 B2
(45) Date of Patent: Oct. 4, 2005

(54) METHOD TO DETERMINE A CHANNEL CHARACTERISTIC, AND DISCRETE WAVELET TRANSMITTER AND RECEIVER TO PERFORM THE METHOD

(75) Inventor: Miguel Peeters, Brussels (BE)

(73) Assignee: Alcatel, Paris (FR)

( * ) Notice: Subject to any disclaimer, the term of this patent is extended or adjusted under 35 U.S.C. 154(b) by 787 days.

(21) Appl. No.: 09/799,129

(22) Filed: Mar. 6, 2001

(65) Prior Publication Data

US 2001/0033612 A1 Oct. 25, 2001

(30) Foreign Application Priority Data

Mar. 7, 2000 (EP) .......................................... 00400620

(51) Int. Cl.[7] .......................... H04L 5/16; H04B 14/04
(52) U.S. Cl. ...................................... 375/222; 375/353
(58) Field of Search ............................... 375/219, 222, 375/229, 295, 298, 316, 346, 353, 261; 332/115; 370/533

(56) References Cited

U.S. PATENT DOCUMENTS

| | | | | |
|---|---|---|---|---|
| 5,005,189 A | * | 4/1991 | Hackett, Jr. .................. | 375/348 |
| 5,436,940 A | * | 7/1995 | Nguyen ....................... | 375/240 |
| 5,715,280 A | * | 2/1998 | Sandberg et al. ........... | 375/260 |
| 6,101,223 A | * | 8/2000 | Betts .......................... | 375/261 |
| 6,445,731 B1 | * | 9/2002 | Yamano et al. ............. | 375/222 |
| 6,590,893 B1 | * | 7/2003 | Hwang et al. ............... | 370/354 |

OTHER PUBLICATIONS

O. van de Wiel et al.: "Discrete Wavelet Multitone for Copper Line Transmission", Proceedings of the 'Wavelet Analysis: A New Toll in Signal and Image Processing', Symposium, IEEE Benelux Signal Processing Chapter, Antwerp Dec. 11, 1996.

Andrew Bruce et al.: "Wavelet Analysis", IEEE Spectrum, Oct. 1996, pp. 26–35.

Gross, R. et al.: "Discrete Wavelet Multitone (DWMT) System for Digital Transmission Over HFC Links" Proceedings of the SPIE, Oct. 23, 1995, XP000576748.

Sandberg, S. D. et al.: "Overlapped Discrete Multitone Modulation for high Speed Copper Wire Communications" IEEE Journal on Selected Areas in Communications, vol. 13, No. 9, Dec. 1, 1995, pp. 1571–1585, XP000543156, US,New York, NY, ISSN: 0733–8716.

Govardhanagiri, S. et al.: "Performance analysis of multi-carrier modulation systems using cosine modulated filter banks" 1999 IEEE International Conference on Acoustics, Speech, and Signal Processing, vol. 3, Mar. 15–19, 1999, pp. 1405–1408, XP002139688, Piscataway, NJ, USA, IEEE, USA ISBN: 0-7803-5041-3.

* cited by examiner

*Primary Examiner*—Chieh M. Fan
*Assistant Examiner*—Jason M. Perilla
(74) *Attorney, Agent, or Firm*—Sughrue Mion, PLLC

(57) ABSTRACT

To determine the channel characteristic of a channel (CHANNEL) between a transmitter (TX) and a receiver (RX), a predetermined periodic signal of pulse amplitude modulated symbols is modulated on waveforms by a cosine modulated filter bank (DWMT MOD) in the transmitter (TX), and the waveforms are transmitted over the channel (CHANNEL). In the receiver (RX), the received pulse amplitude modulated symbols are demodulated from the waveforms by a cosine modulated filter bank (DWMT DEMOD), pairs of the received pulse amplitude modulated symbols are combined to form received quadrature amplitude modulated symbols, and the received quadrature amplitude modulated symbols are divided by the transmitted predetermined pulse amplitude modulated symbols considered pairwise as transmit quadrature amplitude modulated symbols. So, samples of the channel characteristic are generated.

12 Claims, 2 Drawing Sheets

METHOD TO DETERMINE A CHANNEL CHARACTERISTIC, AND DISCRETE WAVELET TRANSMITTER AND RECEIVER TO PERFORM THE METHOD

BACKGROUND OF THE INVENTION

The present invention relates to a method to determine samples of an estimated channel characteristic of a channel between a transmitter and a receiver, a discrete wavelet multi tone transmitter comprising a cosine modulated filter bank adapted to modulated waveforms with transmit pulse amplitude modulated symbols, and a discrete wavelet multi tone receiver comprising a cosine modulated filter bank adapted to demodulate received pulse amplitude modulated symbols from waveforms, both equipped to perform steps of this method.

An overview of techniques to test or qualify digital subscriber lines is given in the article 'DSL Loop Test' from the authors Eric Hedlund and Tom Cullinan. This article was published on pages 48–52 of the Aug. 24, 1998 issue of the magazine '*Telephony*', and emphasises the importance of testing loops before xDSL (any Digital Subscriber Line) services are provided there over. Through loop testing line imperfections such as load coils or bridged taps can be localised, and noise such as near-end crosstalk or far-end crosstalk can be measured. Moreover, knowledge of the channel impulse response facilitates synchronisation between the central office and customer premises equipment and setting the taps of an adaptive equaliser (equalising the channel characteristic so that the length of the cyclic prefixes or suffixes added to data symbols to avoid inter-symbol interference remains acceptable) in the receiver.

The known channel analysis techniques require separate test instruments. In the above mentioned article 'DSL Loop Test' a distinction is made between single-ended channel testing that requires test equipment only at the central office, and double-ended channel testing that requires test equipment at both ends, i.e. at the customer premises as well as at the central office. Double-ended testing requires dispatching of a technician, which is an extra expense that is difficult to justify. Amongst the known loop qualification techniques, singe-ended testing with test equipment only at the central office and without involvement of on-site technicians, is most cost-effective.

SUMMARY OF THE INVENTION

An aspect of the present invention is to provide a method to determine the channel characteristic of a loop which does not require substantial additional hardware, i.e. which does not require separate test equipment at the central office or at the customer premises, and which also does not require the presence of technicians at the customer premises site or the central office site.

According to the present invention, this aspect is realized by the method to determine samples of an estimated channel characteristic of a channel between a transmitter and a receiver, the discrete wavelet multi tone transmitter comprising a cosine modulated filter bank adapted to modulated waveforms with transmit pulse amplitude modulated symbols, and the discrete wavelet multi tone receiver comprising a cosine modulated filter bank adapted to demodulate received pulse amplitude modulated symbols from waveforms.

Indeed, the insight that for a periodic pulse amplitude modulated (PAM) signal, transmitted between a discrete wavelet multi tone (DWMT) transmitter and a discrete wavelet multi tone (DWMT) receiver, each pair of pulse amplitude modulated (PAM) symbols constitutes a quadrature amplitude modulated (QAM) symbol that is rotated and attenuated by the channel impulse response of the channel over which the signal is transferred, provides an automated way for estimating the channel impulse response that does not require substantial additional hardware at the central office or customer premises site of a DWMT system. At the transmitter's side, a pulse amplitude modulation (PAM) symbol generator able to generate a predetermined periodic signal is required and at the receiver's side received pulse amplitude modulated (PAM) symbols have to be combined pairwise and have to be divided by the pairwise combined predetermined transmitted pulse amplitude modulated (PAM) symbols, which are tasks that can be performed by the digital signal processing (DSP) functionality typically available in DWMT receivers.

It is noticed that the use of discrete wavelet multi tone DWMT transmitters and receivers for high speed digital data transfer over copper lines is described in detail in the article '*Discrete Wavelet Multitone for Copper Line Transmission*' from the authors O. van de Wiel, L. Vandendorpe and M. Peeters. This article has been published in the '*Wavelet Analysis: A New Tool in Signal and Image Processing*'— Symposium, organised by IEEE Benelux Signal Processing Chapter on Dec. 11, 1996 in Antwerp, but does not suggest to use the DWMT transmitter and receiver capabilities to determine the channel impulse response of the copper line. Also the article '*Wavelet Analysis*' authored by Andrew Bruce, David Donoho and Hong-Ye Gao, and published in the October 1996 issue of the magazine '*IEEE Spectrum*' that mentions several applications of wavelets including compression, speeding matrix computation, and noise removal in signals and images, does not teach to use wavelet technology in combination with a particular treatment of a periodic pre-determined pulse amplitude modulated (PAM) signal to estimate the channel impulse response of a loop over which the pulse amplitude modulated (PAM) symbols are transferred.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

An additional, optional feature of the method to determine an estimated channel characteristic by inverse Fourier transforming samples of the estimated channel characteristic.

In this way, by inverse Fourier transforming the samples of the estimated channel characteristic, a time domain representation of the channel characteristic is obtained.

BRIEF DESCRIPTION OF THE DRAWINGS

The above mentioned and other aspects and features of the invention will become more apparent and the invention itself will be best understood by referring to the following description of an embodiment taken in conjunction with the accompanying drawings wherein.

DETAILED DESCRIPTION OF THE INVENTION

Figure 1:
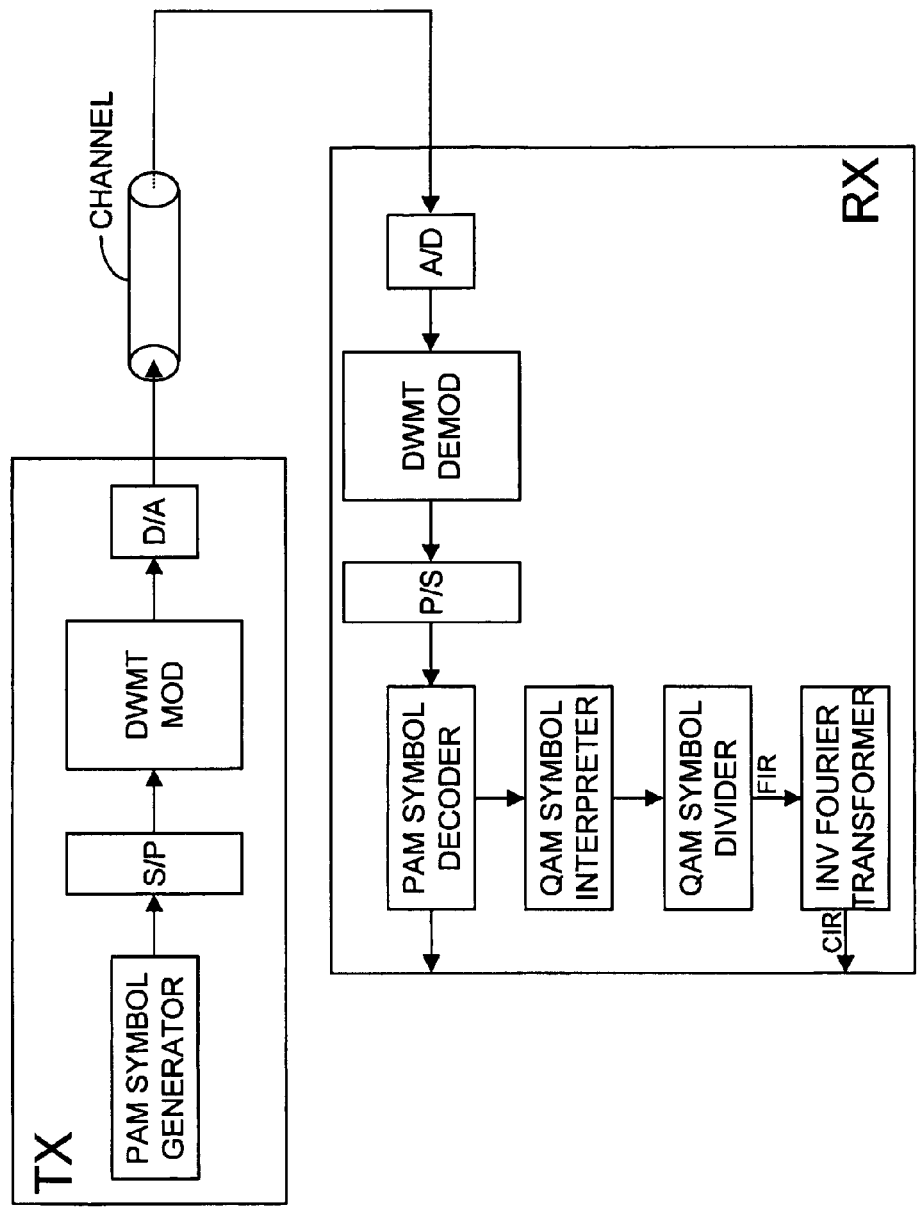
FIG. 1 depicts a functional block scheme of an embodiment of the discrete wavelet multi tone transmitter TX according to the present invention and a functional block scheme of an embodiment of the discrete wavelet multi tone receiver RX according to the present invention.

The discrete wavelet multi tone transmitter TX of FIG. 1 contains the cascade coupling of a pulse amplitude modulation symbol generator PAM SYMBOL GENERATOR, a serial to parallel converter S/P, a discrete wavelet multi tone modulator DWMT MOD, and a digital to analogue converter D/A whose output is coupled to a copper telephone line CHANNEL between the discrete wavelet multi tone transmitter TX and the discrete wavelet multi tone receiver RX. This discrete wavelet multi tone receiver RX contains between an input terminal whereto the copper telephone line CHANNEL is connected and a data output terminal the cascade coupling of an analogue to digital converter A/D, a discrete wavelet multi tone demodulator DWMT DEMOD, a parallel to serial converter P/S and a pulse amplitude modulation symbol decoder PAM SYMBOL DECODER. The latter pulse amplitude modulation symbol decoder PAM SYMBOL DECODER via a second output thereof is connected to the cascade coupling of a quadrature amplitude modulated symbol interpreter QAM SYMBOL INTERPRETER, a quadrature amplitude modulated symbol divider QAM SYMBOL DIVIDER, and an inverse fast Fourier transformer INV FOURIER TRANSFORMER. An output of the inverse fast Fourier transformer INV FOURIER TRANSFORMER serves as second output terminal for the discrete wavelet multi tone receiver RX.

During normal operation, the discrete wavelet multi tone modulator DWMT MOD modulates pulse amplitude modulation (PAM) encoded digital data, received at an input of the discrete wavelet multi tone transmitter TX not drawn in FIG. 1, on a number of waveforms. The sum of these waveforms is converted into an analogue signal by the digital to analogue converter D/A and transmitted over the telephone line CHANNEL towards the discrete wavelet multi tone receiver RX. In the discrete wavelet multi tone receiver RX, the received signal is sampled by the analogue to digital converter A/D and the waveforms are demodulated by the discrete wavelet multi tone demodulator DWMT DEMOD. The so generated pulse amplitude modulation (PAM) encoded symbols are serialised by the parallel to serial converter P/S and are decoded by the pulse amplitude modulation symbol decoder PAM SYMBOL DECODER before they are outputted.

To measure the channel characteristic of the channel CHANNEL between transmitter TX and receiver RX, a periodic signal of M waveforms modulated with M pulse amplitude modulation (PAM) encoded symbols is transmitted over the channel CHANNEL between the discrete wavelet multi tone transmitter TX and the discrete wavelet multi tone receiver RX. The M predetermined pulse amplitude modulation (PAM) symbols are generated periodically by the pulse amplitude modulation symbol generator PAM SYMBOL GENERATOR, and are modulated on the M waveforms by the discrete wavelet multi tone modulator DWMT MOD. In the receiver RX, the discrete wavelet multi tone demodulator DWMT DEMOD and the pulse amplitude modulation symbol decoder PAM SYMBOL DECODER respectively demodulate the received pulse amplitude modulation symbols from the M waveforms and decode the pulse amplitude modulation symbols, just like they received normal data. The decoded pulse amplitude modulation symbols however are supplied to the quadrature amplitude modulation symbol interpreter QAM SYMBOL INTERPRETER that combines the received PAM symbols pairwise to constitute QAM symbols. From these QAM symbols, the channel attenuation and channel phase at the M frequencies $$\frac{k}{M \cdot T}$$

(herein T represents the sample periods and k is an integer index whereby k=1 ... M) can be derived by solving a linear set of equations describing the input-output relation of the channel CHANNEL. This set of equations is solved by the quadrature amplitude modulation symbol divider QAM SYMBOL DIVIDER that divides the QAM symbols constituted by the quadrature amplitude modulation symbol interpreter QAM SYMBOL INTERPRETER through pairwise combining the received PAM symbols by QAM symbols constituted by pairwise combining the predetermined transmitted PAM symbols that were generated by the pulse amplitude modulation symbol generator PAM SYMBOL GENERATOR and that are periodically modulated on the waveforms in the channel characterisation mode. M samples of the channel frequency response FIR are thus calculated by the quadrature amplitude modulation symbol divider QAM SYMBOL DIVIDER. M samples of the time domain channel impulse response CIR are obtained by inverse Fourier transforming the M samples of the channel frequency response FIR. This is the task of the inverse fast Fourier transformer INV FOURIER TRANSFORMER in the discrete wavelet multi tone receiver RX.

The above described way of measuring the channel characteristic of a channel CHANNEL is based on the insight that for a periodic pulse amplitude modulated (PAM) signal transmitted between a discrete wavelet multi tone transmitter TX and a discrete wavelet multi tone receiver RX, each pair of pulse amplitude modulated (PAM) symbols forms a quadrature amplitude modulation (QAM) symbol that is rotated and attenuated by the channel response at frequency $$\frac{k}{M \cdot T}$$

of the channel over which the signal is transferred. This insight is derived mathematically in the following paragraphs.

Figure 2:
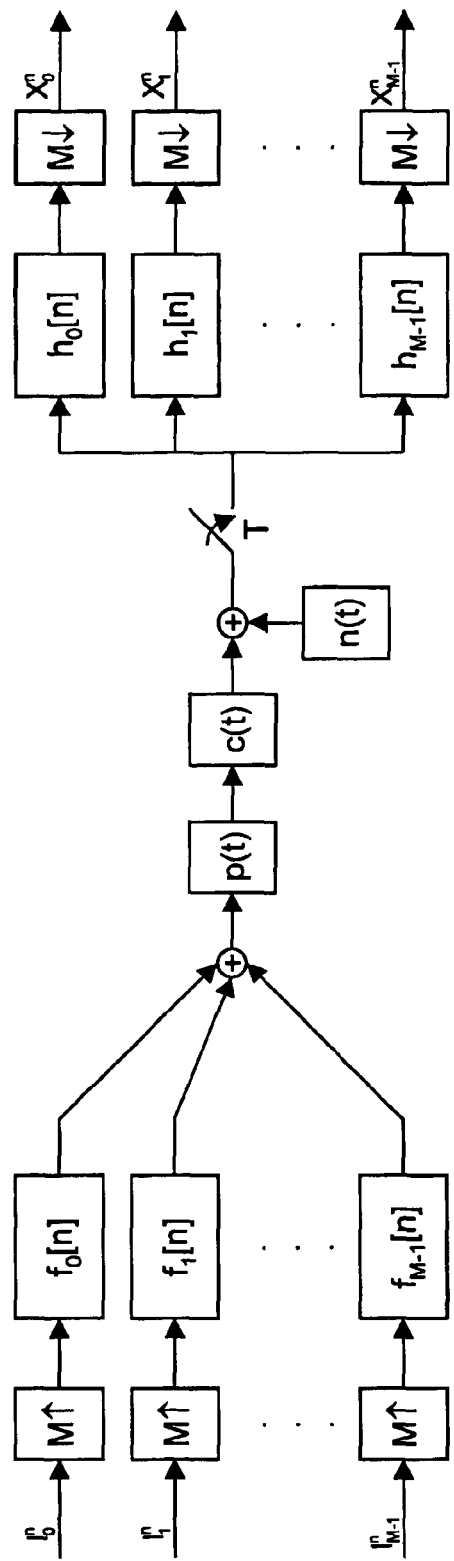
FIG. 2 depicts the synthesis part and analysis part of a maximally decimated filter bank used respectively in the discrete wavelet multi tone modulator DWMT MOD and discrete wavelet multi tone demodulator DWMT DEMOD of the embodiment of the present invention drawn in FIG. 1.

As depicted in FIG. 2, the discrete wavelet multi tone modulator DWMT MOD is supposed to be made by the synthesis part of a maximally decimated filter bank composed of M FIR (Finite Impulse Response) filters $f_p[n]$ of length N=2KM, K being an integer value. In the sequel, M is restricted to be even. In the receiver RX, the discrete wavelet multi tone demodulator DWMT DEMOD is formed by the analysis part of a filter bank whose filters are the time reversed versions of the synthesis ones: $h_p[n]=f_p[N-n-1]$. Every M samples (M↑) a set of M pulse amplitude modulation (PAM) symbols $I_p^m$, p being an integer values with values p=0 ... M−1, is modulated on the waveforms $f_p$.

Hence, the continuous transmit time domain signal can be written as:

$$s(t) = \sum_{m=-\infty}^{+\infty} \sum_{n=-\infty}^{+\infty} \sum_{p=0}^{M-1} I_p^m \cdot f_p[n-mM] \cdot p(t-nT) \quad (1)$$

Herein:

T represents the sampling period;

M represents the number of waveforms;

p(t) represents the interpolation pulse;

$f_p[n]$ represents the synthesis filter of the p-th waveform; and n, m and p are integer indices.

The signal s(t) is transmitted over the channel CHANNEL that will be modelled by an impulse response c(t) and noise n(t) added at the receiver input as shown in FIG. 2. The signal at the input of the demodulator DWMT DEMOD hence is given by:

$$r(t) = s(t) \otimes c(t) + n(t) \quad (2)$$

$$= \sum_{p=0}^{M-1} \sum_{m=-\infty}^{+\infty} \sum_{l=-\infty}^{+\infty} I_p^m \cdot f_p[l-mM] \cdot c(t-lT) + n(t)$$

$$= \sum_{p=0}^{M-1} \sum_{m=-\infty}^{+\infty} I_p^m \cdot g_{p,eq}(t-mMT) + n(t)$$

Herein:

$\otimes$ represents the convolution;

l is an integer index;

c(t) represents the channel impulse response; and $g_{p,eq}(t)$ represents the composite channel, defined as:

$$g_{p,eq}(t) = \sum_{l=0}^{2KM-1} f_p[l] \cdot c(t-lT) \quad (3)$$

The symbols generated at the transmit side, i.e. the PAM symbols modulated on each waveform, are time invariant, so $I_p^m = I_p$ for all m. Moreover, a function $c^{fold}(t)$ can be defined, that is the folded version of the channel c(t) with a period MT:

$$c^{fold}(t) = \sum_{m=-\infty}^{+\infty} c(t-mMT) \quad (4)$$

and a folded version of the composite channel can be defined as follows:

$$g_{p,eq}^{per}(t) = \sum_{m=-\infty}^{+\infty} g_{p,eq}(t-mMT) \quad (5)$$

$$= \sum_{l=0}^{2KM-1} f_p[l] \cdot c^{fold}(t-lT)$$

With the definitions (4) and (5), the signal at the input of the demodulator DWMT DEMOD is given by:

$$r(t) = \sum_{p=0}^{M-1} I_p \cdot g_{p,eq}^{per}(t) + n(t) \quad (6)$$

The signal r(t) is synchronously sampled at a frequency 1/T and digitally filtered by the analysis filter bank. The signal at the output of the q-th analysis filter then is given by:

$$x_q[n] = r(n'T) \otimes h_q[n'] + n(n'T) \otimes h_q[n'] + \eta_q[n] \quad (7)$$

$$= \sum_{p=0}^{M-1} I_p \cdot g_{p,eq}^{per}(n'T) \otimes h_q[n'] + \eta_q[n]$$

Herein: $\eta_q[n]$ represents a random variable with zero mean corresponding to the noise n(t) sampled and filtered by the filter $h_q$. Because of its periodicity, $g_{p,eq}^{per}(n'T)$ can be developed by an M points discrete Fourier Transform, which leads to:

$$x_q[n] = \frac{1}{M} \cdot \sum_{p=0}^{M-1} I_p \sum_{k=0}^{M-1} G_{p,eq}^{per}[k] \cdot e^{2\pi j \frac{kn'}{M}} \otimes h_q[n'] \quad (8)$$

By using the equality in (9), $$e^{2\pi j \frac{kn'}{M}} \otimes h_q[n'] = H_{q,k} \cdot e^{2\pi j \frac{kn}{M}} \quad (9)$$

wherein $H_{q,k}$ is the z-transform of the filter $h_q[n']$ taken at $$z = e^{2\pi j \frac{k}{M}},$$

equation (8) can be reformulated as:

$$x_q[n] = \frac{1}{M} \cdot \sum_{k=0}^{M-1} I_p \sum_{k=0}^{M-1} G_{p,eq}^{per}[k] \cdot H_{q,k} \cdot e^{-2\pi j \frac{kn}{M}} + \eta_q[n] \quad (10)$$

$G_{p,eq}^{per}[k]$ can be calculated by noticing that:

$$g_{p,eq}^{per}(nT) = \sum_{i=0}^{2K-1} \sum_{l=iM}^{(i+1)M-1} f_p[l] \cdot c^{fold}(nT-lT) \quad (11)$$

$$= IDFT\left(\sum_{i=0}^{2K-1} DFT_i(f_p) \cdot DFT(c^{fold})\right)[n]$$

Herein, DFT represents the Discrete Fourier Transform operator, and $DFT_i$ is a Discrete Fourier Transform taken on the block of samples with index iM till (i+1)M−1. By taking the Discrete Fourier Transform of equation (11) the coefficients $G_{p,eq}^{per}[k]$ are obtained:

$$G_{p,eq}^{per}[k] = DFT(c^{fold})[k] \cdot \left(\sum_{i=0}^{2K-1} DFT_i(f_p)[k]\right) \quad (12)$$

By noticing that $$\sum_{i=0}^{2K-1} DFT_i(f_p)[k] = F_p\left(e^{2\pi j \frac{k}{M}}\right)$$

with $F_p(z)$ being the z-transform of $f_p[n]$, the outputs of the demodulator as a function of $C_k$, whereby $C_k$ is defined as $C_k = DFT(c^{fold})[k]$, are given by:

$$x_q[n] = \frac{1}{M} \cdot \sum_{k=0}^{M-1} \left[\left(\sum_{p=0}^{M-1} I_p \cdot F_{p,k}\right) \cdot H_{q,k} \cdot e^{2\pi j \frac{kn}{M}}\right] \cdot C_k + \eta_q[n] \quad (13)$$

Herein, the notation $F_{p,k}$ is used with a meaning similar to $H_{p,k}$.

The outputs of the analysis filter banks are downsampled at the instant $mM-1$ ($\underline{M}\downarrow$). The m-th output of the q-th branch of the analysis filter bank is then given by equation (14):

$$X_q^m = \frac{1}{M} \cdot \sum_{k=0}^{M-1} \left(\sum_{p=0}^{M-1} I_p \cdot F_{p,k} \cdot H_{q,k} \cdot e^{-2\pi j \frac{k}{M}}\right) \cdot C_k + \eta_q^m \quad (14)$$

$$= \frac{1}{M} \cdot \sum_{k=0}^{M-1} \left(\sum_{p=0}^{M-1} I_p \cdot F_{p,k} \cdot F_{q,k}^*\right) \cdot C_k + \eta_q^m$$

$$= \frac{1}{M} \cdot \sum_{p=0}^{M-1} I_p \cdot \left[2 \cdot \mathrm{R} \cdot \left(\sum_{k=1}^{\frac{M}{2}-1} I_p \cdot F_{p,k} \cdot F_{q,k}^* \cdot C_k\right) + \right.$$

$$\left. F_{p,0} \cdot F_{q,0} \cdot C_0 + F_{p,\frac{M}{2}} \cdot F_{q,\frac{M}{2}} \cdot C_{\frac{M}{2}}\right] + \eta_q^m$$

The derivation of equation (14) is done thanks to the time reversed property of the analysis filter bank. By taking the mathematical expectation of $X_q^m$, the noise terms disappear, which leads to the following expression for the mean value at the output of the q-th branch of the analysis filter bank is given by:

$$X_q = E[X_q^m] \quad (15)$$

$$= \frac{1}{M} \sum_{p=0}^{M-1} I_p \left[2 \cdot \mathrm{R}\left(\sum_{k=1}^{\frac{M}{2}-1} F_{p,k} \cdot F_{q,k}^* \cdot C_k\right) + \right.$$

$$\left. F_{p,0} \cdot F_{q,0} \cdot C_0 + F_{p,M/2} \cdot F_{q,M/2} \cdot C_{M/2}\right]$$

By defining the real column vectors $$X = [X_0 \ X_1 \ \ldots \ X_M]^t \text{ and}$$

$$C = \left[C_0 \ \mathrm{R}(C_1) \ \mathrm{T}(C_1) \ \mathrm{R}(C_2) \ \cdots \ C_{\frac{M}{2}}\right]^t,$$

the set of M equations of expression (15) can be rewritten in matrix format as:

$$X = \Re \cdot C \quad (16)$$

Herein $\Re$ represents a square matrix of dimension M, defined as:

$$\Re_{ij} = \begin{cases} b_0 \cdot F_{i,0} & \text{for } j = 0 \\ 2\mathrm{R}(b_l F_{i,1}^*) & \text{for } j = 2l-1 \text{ with } l = 1 \ldots \frac{M}{2}-1 \\ -2\mathrm{T}(b_l \cdot F_{i,1}^*) & \text{for } 2 = 2l \text{ with } l = 1 \ldots \frac{M}{2}-1 \\ b_{\frac{M}{2}} \cdot F_{i,\frac{M}{2}} & \text{for } j = M-1 \end{cases} \quad (17)$$

Herein:

$$b_k = \frac{1}{M} \cdot \sum_{p=0}^{M-1} I_p \cdot F_{p,k} \quad (18)$$

Therefore, if $\Re$ is reversible and the transmit symbols $I_p$ are constant and known, $c^{fold}[n]$ can be computed at the receiver RX by constructing the $\Re$ matrix according to the synthesis filter banks $f_p$ and transmit symbols $I_p$, inverting the $\Re$ matrix for computing the real vector C, generating complex values $C_k$ with $k=1 \ldots M-1$ by using the relation $C_{M-k} = C^*_k$, and taking the IDFT of the M values $C_k$ for computing the M real values $c_{fold}[n]$. The folded channel will be a good approximation of the real channel if the sampled impulse response of the channel is shorter than M samples.

In general, the system to invert is a linear system of M equations in the M unknown of the vector C. This system can be simplified for cosine modulated filter banks if the low pass prototype has been optimised by maximising the stopband attenuation. Indeed, the properties of a transmultiplexer are strongly dependent on the synthesis and analysis filter banks. A usual choice are the cosine modulated filter banks because they can be implemented with a fast transform and allow good spectral containment. Each synthesis filter $f_k[n]$ is made by the modulation of a real low pass prototype, $h[n]$, as shown below:

$$f_k[n] = h[n] \cdot \sqrt{\frac{2}{M}} \cdot \cos\omega_k(n + \theta_k) \quad (19)$$

at the frequencies:

$$\omega_k = \left(k + \frac{1}{2}\right)\frac{\pi}{M} \quad (20)$$

Herein, $\theta_k$ is a set of phases that depends on the filter bank choice. The low pass prototype has a length of $N=2$ KM samples with K an integer value called the overlap factor, and is symmetric so that $h[n]=h[N-n-1]$. By further imposing constraints on the prototype and the phases, it is possible to design filter banks with the perfect reconstruction property. In the sequel, the spectral properties of the analysis and the synthesis filters will be useful. Their z-transform can be derived and are given by:

$$F_k(z) = \sqrt{\frac{1}{2M}} \cdot (e^{-j\theta_k} \cdot H(ze^{j\omega_k}) + e^{-j\theta_k} \cdot H(ze^{-j\omega_k})) \quad (21)$$

$$H_k(z) = F_k(z^{-1}) \cdot z^{-(N-1)} \quad (22)$$

$$= \sqrt{\frac{1}{2M}} \cdot (e^{-j\theta_k} \cdot H(z^{-1} e^{j\omega_k}) + e^{j\theta_k} \cdot H(z^{-1} e^{-j\omega_k})) \cdot z^{-(N-1)}$$

Herein:

$$H(z) = \sum_{n=0}^{N-1} h[n] \cdot z^{-n}$$

represents the z-transform of the prototype.
Because the low pass prototype is symmetric and real, its z-transform has the following property on the unity circle:

$$H^2(e^{j\theta}) = |H(e^{j\theta})|^2 \cdot e^{-j(N-1)\theta} \quad (23)$$

with θ being a real angle.
The assumption that the real low pass prototype h[n] is optimised by maximising its stopband attenuation, defined as the energy above the cut off frequency $$\frac{\pi}{2M},$$

can be written mathematically as:

$$|H(e^{j\theta})|^2 << \left|H\left(e^{j\frac{\pi}{2M}}\right)\right|^2 \text{ if } |\theta \bmod 2\pi| > \frac{\pi}{M} \quad (24)$$

By neglecting the small terms in $F_{p,k}$ and by taking into account the property (23) of the low pass prototype, equation (15) can be rewritten as:

$$X_0 = \frac{1}{M} \cdot I_0 \cdot F_0^2(1) \cdot C_0 \quad (25)$$

$$X_{M-1} = \frac{1}{M} \cdot I_{M-1} \cdot F_{M-1}^2(-1) \cdot C_{\frac{M}{2}}$$

$$X_{2k-1} = \frac{1}{M^2} \left|H\left(e^{j\frac{\pi}{2M}}\right)\right|^2 \cdot \mathcal{R}\left[\left(I_{2k-1} + I_{2k} \cdot e^{j(\theta_{2k} - \theta_{2k-1} + \frac{(N-1)\pi}{2M})}\right) \cdot C_k\right]$$

$$X_{2k} = \frac{1}{M^2} \left|H\left(e^{j\frac{\pi}{2M}}\right)\right|^2 \cdot \mathcal{R}\left[\left(I_{2k-1} \cdot e^{j(\theta_{2k} - \theta_{2k-1} + \frac{(N-1)\pi}{2M})} + I_{2k}\right) \cdot C_k\right]$$

For cosine modulated filters $$\theta_{2k} - \theta_{2k-1} + \frac{(N-1)\pi}{2M} = -\frac{\pi}{2} \text{ for } k = 1 \ldots \frac{M}{2} - 1.$$

If the transmitted quadrature amplitude modulated (QAM) symbols are defined as $Z_k = I_{2k-1} - jI_{2k}$ and the received quadrature amplitude modulated (QAM) symbols are defined as $$Q_k = X_{2k-1} - jX_{2k} \text{ for } k = 1 \ldots \frac{M}{2} - 1,$$

then the equations (25) can be rewritten in the elegant form:

$$X_0 = \frac{1}{M} \cdot I_0 \cdot F_0^2(1) \cdot C_0 \quad (26)$$

$$X_{M-1} = \frac{1}{M} \cdot I_{M-1} \cdot F_{M-1}^2(-1) \cdot C_{\frac{M}{2}}$$

$$Q_k = \frac{1}{M^2} \left|H\left(e^{j\frac{\pi}{2M}}\right)\right|^2 \cdot Z_k \cdot C_k \text{ for } k = 1 \ldots \frac{M}{2} - 1$$

This last set of equations (26) shows that for a periodic signal, each pair of waveforms (2k-1, 2k) with $$k = 1 \ldots \frac{M}{2} - 1,$$

forms a quadrature amplitude modulated (QAM) symbol that is rotated and attenuated by the channel frequency response at the frequency $$\frac{k}{MT}$$

and scaled by a factor dependent on the low pass prototype.
This property of filter banks can be easily understood in the frequency domain. The periodicity of the sampled transmit signal reduces its spectrum to a Dirac comb with a period equal to $$\frac{2\pi k}{M}.$$

The spectral selectivity of the synthesis and analysis filters, expressed by the assumption (24), insured that the component at the frequency $$\frac{2\pi k}{M}$$

of the transmit signal is mainly due to the synthesis filters $f_{2k-1}$ and $f_{2k}$, and interferes mainly with the analysis filters $h_{2k-1}$ and $h_{2k}$. That explains why the symbols $Z_k$ and $Q_k$ are related in the equation (26). Therefore, equation (26) gives a straightforward way to measure the folded channel impulse response $c^{fold}[n]$ with $n=0 \ldots M-1$ if a time invariant signal is transmitted over the channel and analysed at the receiver side. First, the outputs of the demodulator DWMT DEMOD are combined to form quadrature amplitude modulated (QAM) symbols $Q_k$. Then, these received QAM symbols are divided by the transmitted symbols, also considered as quadrature amplitude modulated (QAM) symbols, and scaled by a constant factor to give an estimate $C_k$ with $$k = 1 \ldots \frac{M}{2} - 1.$$

The DC and Nyquist components are calculated by the first two equations in expression (26). Finally, an M-points inverse Fourier Transform is performed on the channel transfer function to lead to the folded channel impulse response.

Although reference was made above to DSL (Digital Subscriber Line) technology used for transmission over twisted pair telephone lines, such as ADSL (Asynchronous Digital Subscriber Line), SDSL (Synchronous Digital Subscriber Line) systems, HDSL (High Speed Digital Subscriber Line) systems, VDSL (Very High Speed Digital Subscriber Line) systems, and the like, any skilled person will appreciate that the present invention also can be applied in for instance cable based or fibre based communication systems, provided that a multi-carrier linecode based on filterbanks is used for transmission of data thereover.

Furthermore, it is remarked that an embodiment of the present invention is described above rather in terms of functional blocks. From the functional description of these blocks it will be obvious for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention.

What is claimed is:

1. A method to determine samples of an estimated channel characteristic of a channel between a transmitter and a receiver, wherein said method comprises:

generating a periodic signal of predetermined transmit pulse amplitude modulated symbols;

modulating waveforms with said periodic signal of predetermined transmit pulse amplitude modulated symbols in a transmit cosine modulated filter bank in said transmitter;

transferring the modulated waveforms from said transmitter to said receiver over said channel;

demodulating said modulated waveforms in a cosine modulated filter bank in said receiver to recover said periodic signal of predetermined transmit pulse amplitude modulated symbols as received pulse amplitude modulated symbols;

combining pairs of said received pulse amplitude modulated symbols to form received quadrature amplitude modulated symbols; and dividing said received quadrature amplitude modulated symbols by transmit quadrature amplitude modulated symbols formed by combining pairs of predetermined transmit pulse amplitude modulated symbols to thereby generate said samples of said estimated channel characteristic.

2. The method to determine samples of an estimated channel characteristic according to claim 1, wherein said method further comprises inverse Fourier transforming said samples of said estimated channel characteristic.

3. A discrete wavelet multi tone receiver comprising:

a receive cosine modulated filter bank adapted to demodulate waveforms modulated by a transmit cosine modulated filter bank to recover a periodic signal of predetermined transmit pulse amplitude modulated symbols as received pulse amplitude modulated symbols, means to combine pairs of said received pulse amplitude modulated symbols to form received quadrature amplitude modulated symbols, and means to divide said received quadrature amplitude modulated symbols by transmit quadrature amplitude modulated symbols formed by combining pairs of predetermined transmit pulse amplitude modulated symbols to thereby generate samples of an estimated channel characteristic of a channel between a transmitter and said discrete wavelet multi tone receiver whenever said periodic signal of predetermined transmit pulse amplitude modulated symbols are transferred.

4. The discrete wavelet multi tone receiver according to claim 3, wherein said discrete wavelet multi tone receiver further comprises an inverse Fourier transformer, adapted to inverse Fourier transform said samples of said estimated channel characteristic.

5. The discrete wavelet multi tone receiver according to claim 3, wherein said means to combine pairs of said received pulse amplitude modulated symbols is a quadrature amplitude modulated symbol interpreter.

6. The discrete wavelet multi tone receiver according to claim 5, wherein said quadrature amplitude modulated symbol interpreter receives decoded pulse amplitude modulated symbols from a pulse amplitude modulated symbol decoder.

7. The discrete wavelet multi tone receiver according to claim 3, wherein said means to divide said received quadrature amplitude modulated symbols is a quadrature amplitude modulated symbol divider.

8. A system comprising:

a discrete wavelet multi tone transmitter comprising:

a transmit cosine modulated filter bank adapted to modulated waveforms with symbols, and a pulse amplitude modulated symbol generator cascade coupled to said transmit cosine modulated filter bank, said pulse amplitude modulated symbol generator being adapted to generate a periodic signal of predetermined transmit pulse amplitude modulated symbols and to apply said periodic signal of predetermined transmit pulse amplitude modulated symbols to said transmit cosine modulated filter bank; and a discrete wavelet multi tone receiver coupled to said discrete wavelet multi tone transmitter, said discrete wavelet multi tone receiver comprising:

a receive cosine modulated filter bank adapted to demodulate waveforms modulated by said transmit cosine modulated filter bank to recover said periodic signal of predetermined transmit pulse amplitude modulated symbols as received pulse amplitude modulated symbols, means to combine pairs of said received pulse amplitude modulated symbols to form received quadrature amplitude modulated symbols, and means to divide said received quadrature amplitude modulated symbols by transmit quadrature amplitude modulated symbols formed by combining pairs of predetermined transmit pulse amplitude modulated symbols to thereby generate samples of an estimated channel characteristic of a channel between the transmitter and said discrete wavelet multi tone receiver whenever said periodic signal of predetermined transmit pulse amplitude modulated symbols are transferred.

9. The system according to claim 8, wherein said discrete wavelet multi tone receiver further comprises an inverse Fourier transformer, adapted to inverse Fourier transform said samples of said estimated channel characteristic.

10. The system according to claim 8, wherein said means to combine pairs of said received pulse amplitude modulated symbols is a quadrature amplitude modulated symbol interpreter.

11. The system according to claim 10, wherein said quadrature amplitude modulated symbol interpreter receives decoded pulse amplitude modulated symbols from a pulse amplitude modulated symbol decoder.

12. The system according to claim 8, wherein said means to divide said received quadrature amplitude modulated symbols is a quadrature amplitude modulated symbol divider.

* * * * *